(No Model.)  3 Sheets—Sheet 1.

W. COOPER.
CONTROLLER FOR ELECTRIC MOTORS.

No. 518,345.  Patented Apr. 17, 1894.

Witnesses.
Chas. E. Van Dorn.
F. S. Lyon

Inventor,
William Cooper.
By Paul & Hawley
Att'ys.

THE NATIONAL LITHOGRAPHING COMPANY,
WASHINGTON, D. C.

(No Model.) 3 Sheets—Sheet 2.

W. COOPER.
CONTROLLER FOR ELECTRIC MOTORS.

No. 518,345. Patented Apr. 17, 1894.

Witnesses,
Chas. E. Van Doren,
F. S. Lyon

Inventor,
William Cooper,
By Paul D. Hawley
attys.

(No Model.)  
3 Sheets—Sheet 3.

W. COOPER.
CONTROLLER FOR ELECTRIC MOTORS.

No. 518,345.  
Patented Apr. 17, 1894.

Witnesses.  
Chas. E. Van Doren.  
R. F. Lyon

Inventor.  
William Cooper.  
By Paul D. Hawley  
Att'ys.

UNITED STATES PATENT OFFICE.

WILLIAM COOPER, OF MINNEAPOLIS, MINNESOTA.

CONTROLLER FOR ELECTRIC MOTORS.

SPECIFICATION forming part of Letters Patent No. 518,345, dated April 17, 1894.

Application filed August 28, 1893. Serial No. 484,162. (No model.)

*To all whom it may concern:*

Be it known that I, WILLIAM COOPER, of the city of Minneapolis, county of Hennepin, State of Minnesota, have invented a certain new and Improved Controller for Electric Motors, of which the following is a specification.

My invention relates to a system and means for controlling the application of electricity to electric motors, and in particular to those belonging to electric motor cars.

The object of my invention is to provide a system and means for operating electric motors, particularly those of electric cars by which the motors are first thrown into the circuit through a gradually decreased portion of a large adjustable resistance, the motors at such time being connected in series between the power station and ground; the said resistance then removed to permit the motors to run free; the motors then connected in multiple and the remainder of said resistance then restored and gradually and finally cut out, whereby the motors are started slowly and with great power, and then speed gradually and without perceptible fluctuation increased to the rate desired, and further the resistance in the line at starting graduated to the load or conditions of the work.

To this end my invention consists in a certain system and electrical mechanism for controlling electric motors, all as hereinafter fully described and particularly pointed out in the claims.

My invention will be more readily understood by reference to the accompanying drawings, forming a part of this specification, and in which—

Figure 1:
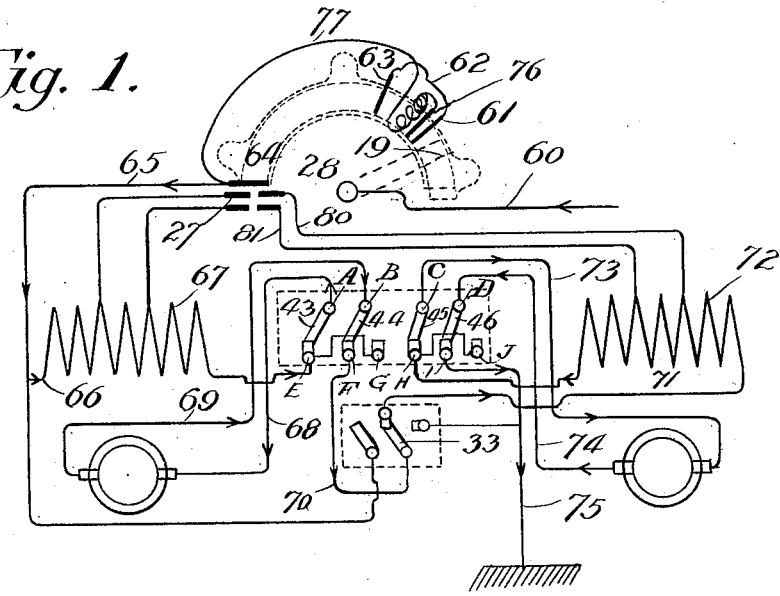
Figure 2:
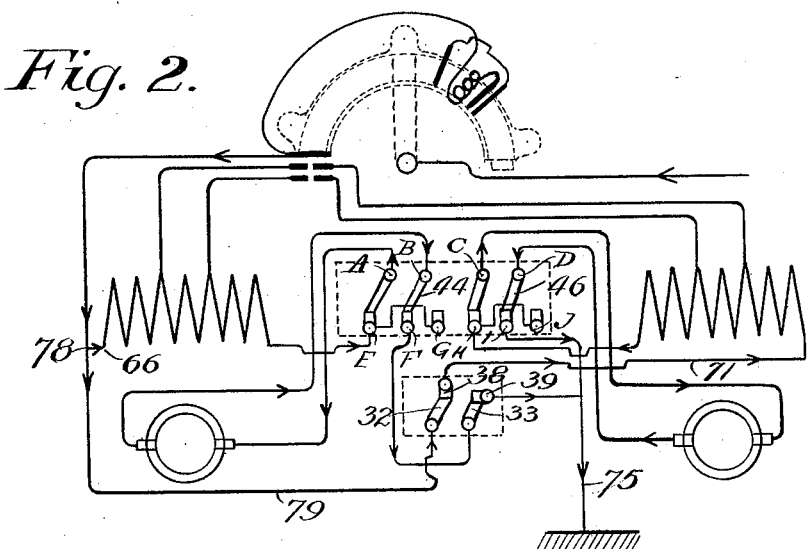
Figure 4:
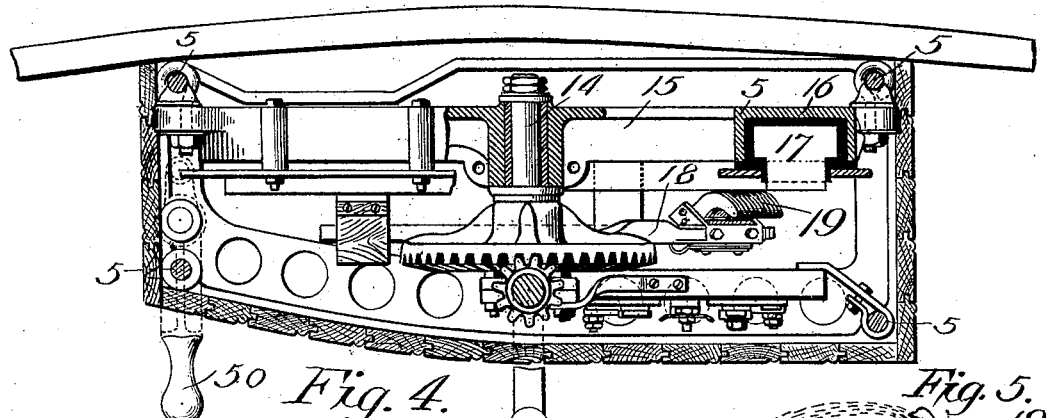
Figure 5:
Figure 3:
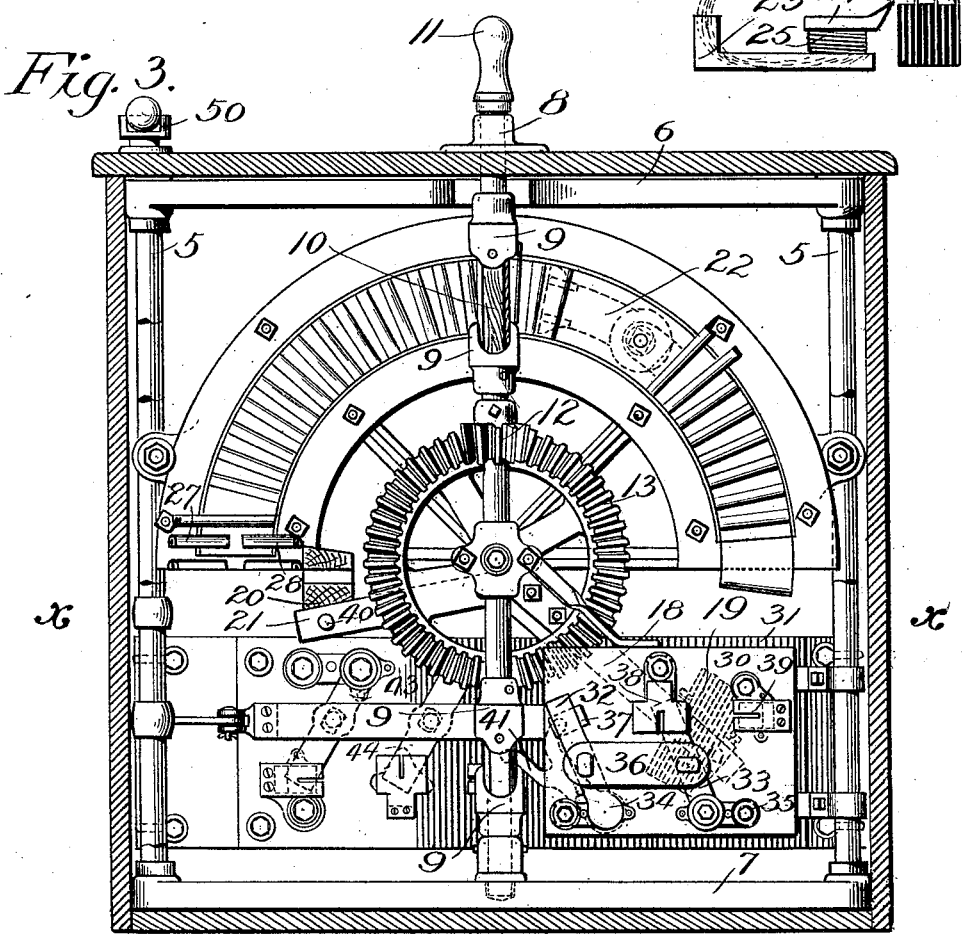
Figure 6:
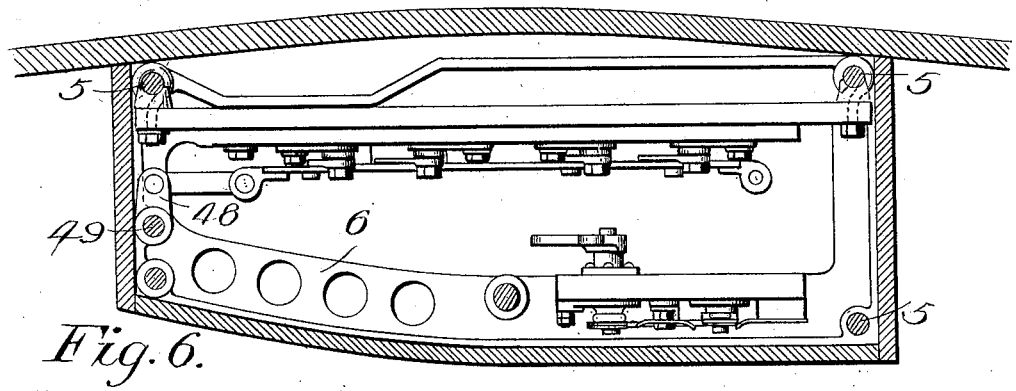
Figure 7:
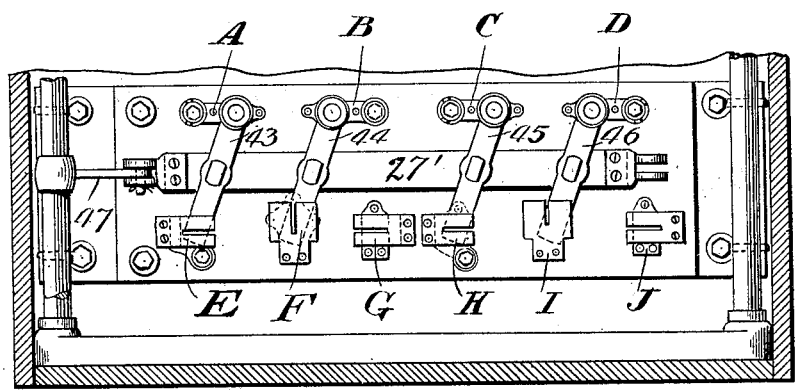
Figure 8:
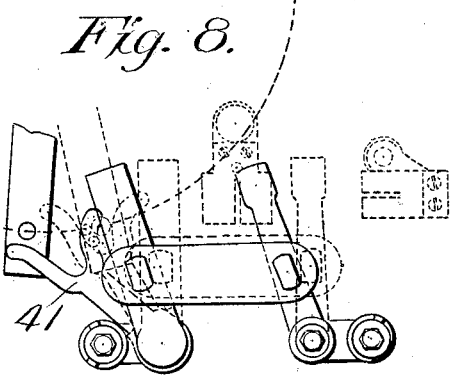
Figure 9:
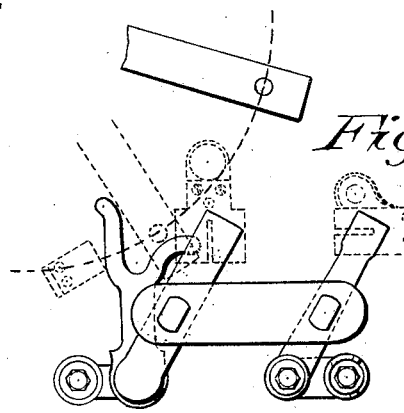

Figure 1 is a diagrammatic view showing series connections of motors with my rheostat and switch. Fig. 2 is a similar view showing parts in multiple arrangement. Fig. 3 is a front view of the combined rheostat and switch, the cover of the case being removed. Fig. 4 is a plan view thereof, the casing and parts of the device being broken away to more clearly show the construction thereof. Fig. 5 is a detail view of the magnetic blower employed. Fig. 6 is a plan view thereof on the line *x—x* of Fig. 3, showing only the reversing and changing switch. Fig. 7 is a vertical view showing the reversing switch only. Figs. 8 and 9 are detail views showing the two positions of the series multiple circuit changing switch.

I will first describe the detail construction of my combined rheostat and switch, which mechanism is incased in a suitable wooden block arranged upon the forward platform of the motor car and of about the same height as the dash-board. Within this box is a strong iron frame preferably made up of the corner rods 5 and the top and bottom castings 6, 7. A vertical operating spindle extending upward through the middle of the box being secured in bearings in the frame 7 and a bearing box provided on the top of the wooden case. This spindle or shaft is made in several sections and is provided with coupling heads 9, between which are arranged blocks 10 of insulating material to prevent transmission of current to the operating crank 11. On the spindle is the pinion 12 engaging the large gear 13, which is secured upon the short shaft 14 having bearings in the semicircular casting or frame piece 15. This casting is provided with the deep annular channel 16 to contain insulating material and the section 17 of high electrical resistance material and separated thereby. The sections are preferably made up of small pieces of sheet metal and several sections are connected with one another in series. The gear 13 carries the arm 18 provided with the brush or finger 19 adapted to sweep over the commutator-like arrangement of resistance sections.

20 represents a wooden stop-block secured on a lug of the frame-piece 15 and with which the brush-arm engages after all the resistance has been cut out. Movement in the opposite direction is prevented by the engagement of the arm 21 with the under side of the block 20.

A peculiar feature of the rheostat is the separation of the resistance sections into two groups, one a small group over which the brush sweeps during the starting of the car or motor, and, the other a larger group separated from the first by a gap 22 preferably filled with an insulating material, and within which I arrange a magnetic blower of the construction best shown in Fig. 5 and adapted to extinguish an arc between the sections and brush. The blower consists of an iron body piece 23, having at one end a core or stud surmounted by the block 24 and about which core is a small coil of wire 25 through which current is passed the instant the brush leaves the last section of the small group of the resistance sections, thereby strongly energizing the iron portions of the blower with the result that any arc momentarily springing between the last resistance section and the brush will be immediately blown out and injury to the device avoided. At the end of the resistance of the larger group I provide one or more pairs of contact blocks 27, 28 for loop connections with the field coils of the motors.

Beneath the rheostat frame 15 and in the bottom of the box are two switch boards 30 and 31 suitably supported. The former carries a four point switch, while the latter is provided with two five point switches. On the board 30 the switch arms 32 and 33 are pivoted on the binding post blocks 34 and 35 respectively and are connected by a strap 36 of insulating material. The ends of the arms are adapted to be swung from contact with the dead-point 37 and the contact point 38, respectively, into engagement with the latter and the contact block 39. For so moving the switch arms during the time in which the contact brush is passing from the last section of the small group to the first section of the larger group of resistance I provide the arm 21 with a pin 40 adapted to engage the yoke 41 fastened in the short shaft of the arm 32. The movement of the arm 21 swings the yoke 41 and hence the switch arms on the board 30. The fingers of the yoke 41 are so curved and formed that after reaching a given position the pin on the arm 21 will pass out of engagement therewith to permit the further movement of the contact brush to the end of the resistance commutator. On the other board 31, all of the four switch arms 43, 44, 45 and 46 are connected by a long strap 27' of insulating material, which strap is connected by a link 47 secured to the end of the crank arm 48 fixed on the vertical shaft 49 extending through the top of the casing and having a crank arm or handle 50. This handle is used when it becomes necessary to reverse the motors. The arms 43, 44, 45 and 46 are pivoted on the binding-post blocks A. B. C and D, respectively, and the arms 43 and 44 are adapted to engage the contact blocks E, F, G, while the arms 45 and 46 are arranged to be thrown into engagement with the contact blocks H, I, J.

Referring to the diagrams (Figs. 1 and 2), it will be seen that current from the power station enters through the troller and is conveyed by the wire 60 to the contact arm and brush 19. Current must first pass through all of the resistance sections of the first group or the remainder of the same as the sections are successively cut out, and from the last section 61 of the small group thence through the wire 62 to the first section 63 of the larger group; thence through the large resistance, finally passing out through the section 64 thereof to the line 65. During the slow movement of the contact brush over the sections of the smaller group of resistance, current passes through line 65 to a connection 66 with the field coils 67 of the first motor. The end of the field winding is connected with the contact block on the reversing switch board, and the switch arms being in the position shown in Fig. 1 the current passes thence through the arm 43 and block A to a line 68 connected with the brush of the armature commutator, current passing from thence out through the other brush and through the line 69, through the block E, arm 44, contact point F and thence by line 70 to the arm 33 of the multiple series switch before described. From the contact block 38 of this switch current passes on through line 71 to the field coils 72 of the second motor, and passes out of the same to the contact block H of the reversing switch, thence through the arms 45 to line 73 leading to the armature of the second motor, from whence current returns through line 74 to switch arms 46 in contact with the block I and from said block current passes or returns to ground through the line 75. When the contact brush 19 passes from the section 61 to the contact block 76, and before the multiple series switch is thrown by the arm 21, all of the resistance is cut out and the current is simply passed through the coil of the magnetic blower, passing from thence through the short circuit 77 in connection with the line 65. The free circuit thus established leaves the motors in a most advantageous condition for low speed as the entire applied electro-motive force on the line is divided between the motors. The motors are allowed to run in this manner some time and then the brush is thrown over upon the second group of resistance. As before explained the multiple-series switch on board 30 is thrown in the interval and the former series connection of the motors is instantly changed to a multiple arc arrangement. This is shown clearly in Fig. 2 of the drawings where it will be seen that the simple movement of the arms 32 and 33 into engagement with the contact blocks 38 and 39 results in the division of the current at the point 78, part of the current passing into the field coils of the first motor through the line 66 while the remainder flows through the line 79, switch arm 32, and line 71 to a similar connection with the field coils of the other motor. The two currents after passing through the armatures of the two motors are untied through the reversing switch arms 44 and 46 and the switch 33 with the ground leg 75, thereby completing the multiple circuit including the motors between the power station and the ground. The change from series to a multiple circuit with the same current on the line results in increased speed of the motors and hence of the car whereon they are mounted, and which further increases as the remaining resistance in the large group is cut out by the final movement of the contact brush to the last section 64 of said group. For further increasing the speed of the car I arrange for shunting portions of the field coils of the two motors, providing for this purpose the divided loops 80 and 81 with additional loops all connected with respective bobbins of the field windings and the terminal blocks 27, 28 of the loops being so arranged as to be bridged by the contact brush thereon. When the brush rests upon two loop terminals current switches at that point and the lines 79 and 71 are short circuited, passing directly into the field coils, thence to the armatures and to ground or return through the connection described in connection with Fig. 2.

Having thus described my invention, I claim as new and desire to secure by Letters Patent—

1. The method of operating electric motors, which consists in first arranging the motors in series in an open circuit, then inserting a total resistance and closing the circuit through the same, then gradually cutting out a part of said resistance, then breaking or opening the circuit and while open coupling said motors in multiple arc, and afterward reinstating the remainder of said resistance, and finally gradually cutting out the same, substantially as described.

2. The method of operating electric motors, which consists in first arranging the motors in series in an open circuit, then inserting a total resistance and closing the circuit through the same, then gradually cutting out a part of said resistance, then shunting the current around the remaining resistance and into said motors while in series, then breaking or opening the circuit and while open coupling said motors in multiple arc, and afterward reinstating the remainder of said resistance, and finally gradually cutting out the same, substantially as described.

3. The combination, with the electric motors, of an adjustable resistance connected in the circuit thereof, a multiple series switch arranged in circuit between said motors for connecting the same in series or in multiple arc, and means for cutting out a part of said resistance, then breaking the circuit and throwing said multiple series switch and finally cutting out the remainder of the resistance, substantially as described.

4. The combination, with the electric motors, of an adjustable resistance connected in the circuit thereof, a multiple series switch arranged in circuit between said motors for connecting the same in series or in multiple arc, the contact device of said resistance, and means in connection with said contact device for cutting out a part of said resistance, then breaking the circuit and throwing said multiple series switch, and finally cutting out the remainder of the resistance, substantially as described.

5. The combination, with the electric motors, of an adjustable resistance included in the circuit thereof, a multiple-series switch included between said motors, a gap in said resistance to form a break in the circuit and means to change the position of said switch during such break, substantially as described.

6. The combination, with the electric motors, of two groups of adjustable resistance included in the circuit of said motors, a short circuit or loop extending about the second group and having a terminal between said groups, a movable contact to engage the resistance sections in said groups, and a multiple-series switch included between said motors, and means in connection with said contact for throwing said switch during the movement of said contact from said loop terminal to the second group of adjustable resistance, substantially as described.

7. The combination, with the frame, of the resistance sections arranged therein and insulated therefrom, said sections arranged in two groups, a gap being provided between the same, a contact arm and brush to sweep over said sections, a four point switch, and means in connection with said arm for operating said switch as said brush passes over said gap, substantially as described.

8. The combination, with the semicircularly arranged resistance sections divided into two groups, a central shaft, an arm thereon, a contact brush to engage said sections, a terminal provided between said sections, a terminal provided at the end of the second group of sections, a short circuit between said terminals, and a magnetic blower arranged between said groups and included in said short circuit, substantially as described.

9. The combination, with the frame, of the resistance sections arranged therein in two groups, the vertical shaft, the pinion thereon, the central shaft, the gear to be engaged by said pinion, said gear carrying the contact arm provided with a brush to engage said sections, means for operating said shaft, a switch, a second arm provided on said gear and arranged to operate said switch, a reversing switch, and a second shaft with means in connection therewith for operating said reversing switch, substantially as and for the purpose set forth.

10. The combination, with the two groups of resistance sections arranged with the gap between the same, of a contact device to engage said sections successively, a terminal section provided at the end of the first group of resistance sections, a loop or short circuit extending therefrom to the last section or terminal of the second group of resistance sections, and a magnetic blower provided in the gap between said groups and included in said short circuit, substantially as described.

In testimony whereof I have hereunto set my hand this 9th day of August, 1893.

WILLIAM COOPER.

In presence of—
C. G. HAWLEY,
W. E. GOOLEY.